United States Patent

[11] 3,596,960

| | | |
|---|---|---|
| [72] | Inventors | Gustav Mayer;<br>Horst Klebba, both of Wolfsburg, Germany |
| [21] | Appl. No. | 824,901 |
| [22] | Filed | May 15, 1969 |
| [45] | Patented | Aug. 3, 1971 |
| [73] | Assignee | Volkswagenwerk Aktiengesellschaft<br>Wolfsburg, Germany |
| [32] | Priority | June 6, 1968 |
| [33] | | Germany |
| [31] | | P 17 03 532.4 |

[54] AUXILIARY LOCK FOR DOORS OF MOTOR VEHICLES
5 Claims, 3 Drawing Figs.

[52] U.S. Cl...................................................... 292/216,
292/336.3, 292/45
[51] Int. Cl....................................................... E05c 3/26

[50] Field of Search............................................ 292/216,
376, 207, 45, 336, 280, 48, 52

[56] References Cited
UNITED STATES PATENTS

| 2,381,633 | 8/1945 | Young............................ | 292/207 X |
| 2,922,672 | 1/1960 | Van Voorhees................. | 292/11 |
| 3,040,555 | 6/1962 | Wartian......................... | 292/207 X |

*Primary Examiner*—Richard E. Moore
*Attorney*—Watson, Cole, Grindle & Watson

ABSTRACT: An auxiliary lock for doors of motor vehicles, having a fork member on the impact side of the door which is swiveled by a closing bolt on the doorpost under a spring load. A stop bolt is connected with an operating peg of the main lock, and a spring is provided with the bolt engaging by means of the spring between the prongs of the forked member.

PATENTED AUG 3 1971  3,596,960

INVENTORS
Gustav Mayer
BY Horst Krebba

Watson, Cole, Grindle & Watson
Attys.

AUXILIARY LOCK FOR DOORS OF MOTOR VEHICLES

This invention relates to an auxiliary lock for the door of a motor vehicle, with a fork member disposed on the impact side of the door, which is swivelable by a closing piston under a spring load provided at the doorpost.

The mounting of high doors of motor vehicles in the door frame causes a difficulty insofar as the flutter-free closing of the door requires costly means. The doors for loading spaces of delivery vans may serve as an example, which are drawn from a preliminary rest position to a closing position by operation of a door handle and then are locked. In this case one usually uses two turning trap closures with the same development and function, which are disposed at the dash strip of the door at a distance from one another and are connected by means of a linkage and a reversing gear with the door handle. In such an arrangement, the closing and connecting elements occur twofold, as a result of which the total mechanism is made more expensive.

The invention starts out from the supposition that even for high doors of motor vehicles a single main lock will suffice as the actual closing element. Therefore the invention has an object to create a simple and functionally satisfying auxiliary lock for the flutter-free mounting of the door in the closed state, which fixes the impact side of the door at the desired spot by means of a fork member, known in the case of turning trap closures, in the locking position determined by the main lock.

Another object of the invention resides in the fact that a stop bolt connected with an operating pin of the main lock will penetrate in the closed state of the door by means of a spring between the prongs of the fork member and will fit with a wedge surface against the prong of the fork facing the outside wall of the door and will release the fork member upon opening of the main lock. At the same time, a slidable locking wedge may serve as a stop bolt, which has elongated holes for its guidance and a peg for a traction spring suspended from the door, and which as been disposed for the purpose of an easier final assembly together with the fork member and the spring on a common baseplate.

In a further development of the invention, a linkage has been provided with a slotted hole disposed in the end of the side of the locking wedge, for the purpose of connecting the locking wedge with the operating pin, which oblong hole extends from the pin of the locking wedge assigned to it to the main lock in the unlocked state of the door. For practical purposes the locking wedge has been arranged such that it protrudes with its point, in the unlocked state of the door, possibly to a circular arc, through which the prong of the fork lying to the outside passes during swiveling. Thus the auxiliary lock has also been provided with a preliminary stop position.

The flutter of the door will be eliminated by the invention with only little expense. The fork member blocked in its end position by the stop bolt takes over the function of a mere holding element. It does not reach the end position perhaps by a forced bracing but by the closing movement of the door which is accomplished solely through the main lock. During closing therefore, the expenditure of force at the door handle will be less in comparison to known designs, since one will practically have to overcome merely the friction force of the main lock.

Further objects of the invention will be apparent from the following description when considered in connection with the accompanying drawing in which.

Figure 1:
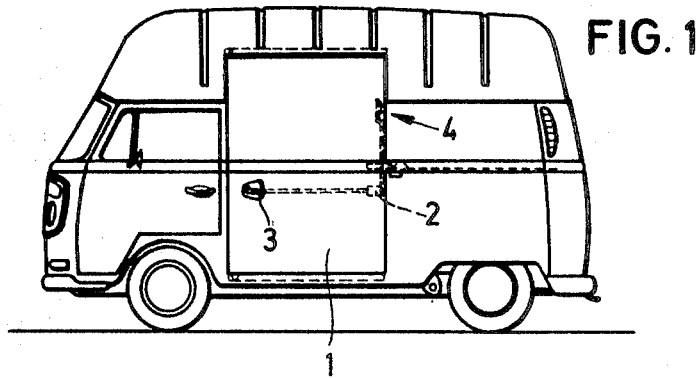
FIG. 1 is a side view of a vehicle in the form of a high-space box-type delivery van.

The numeral 1 designates a sliding door of a high-space box-type delivery van, or vehicle which can be pulled from a preliminary stop position of the main lock 2 by operation or pulling of the door handle 3 into the plane of the wall and can be locked there. Above the main lock 2 an auxiliary lock 4 has been provided, which additionally holds the upper area of the door 1 in a closed position.

Figure 2:
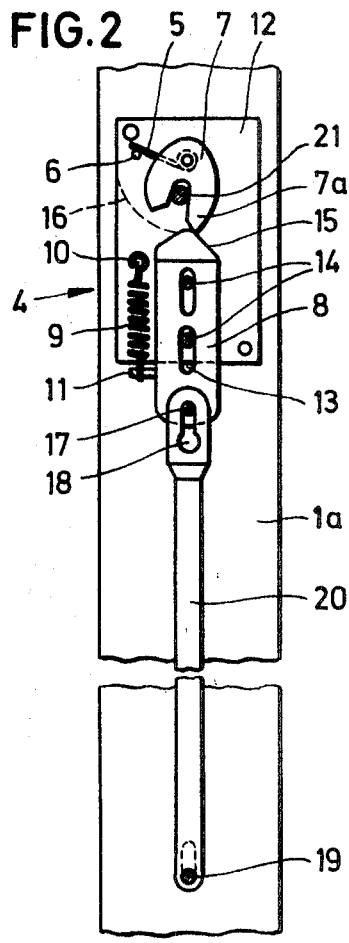
FIG. 2 is a front elevational view of an auxiliary lock according to the invention in the preliminary stop position.
Figure 3:
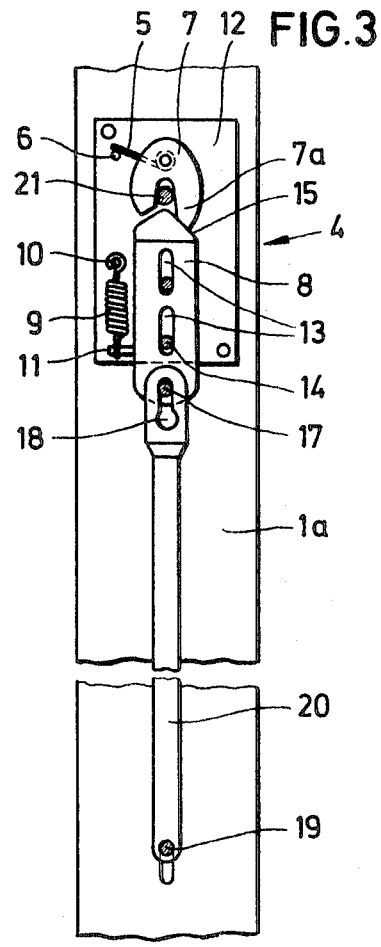
FIG. 3 is a front view of the same auxiliary lock of FIG. 2 in closing position.

The auxiliary lock 4 consists of a fork member 7, FIGS. 2 and 3, with prongs of different length, held in the open position by a torsion spring 5 at a stop 6, a shiftable stop lever or locking wedge 8 and a spiral spring 9, which is attached with one end to a locally fixed bolt 10 and with the other end engages with a peg or pin 11 of the locking wedge 8. These parts are attached with the air of a common baseplate 12 on the dash strip 1a on the impact side of door 1. The locking wedge 8 has been provided with oblong slots 13 for the reception of the guide bolts 14 of the baseplate 12 and it has a wedge-type surface 15 at an upper end which forms a point, which wedge-type surface is intended for cooperation with the longer prong 7a of the fork 7 facing the outside wall of the door. At the same time the locking wedge 8, in the open position of the auxiliary lock 4, has been arranged in such a manner that its point protrudes somewhat into thy circular arc 16 described by the long prong 7a of the fork 7 for the purpose of forming a preliminary stop.

At the lower end of the locking wedge 8 a peg or pin 17 has been provided, which engages with an oblong slot 18 of a linkage 20 connecting the locking wedge 8 with a perpendicularly adjustable operating peg or pin 19 of the main lock 2. This linkage 20 holds the locking wedge 8 in the open position of the auxiliary lock 4, pulled downwards counter to the force of the spiral spring 9.

When swinging the door 1 in, the locking bolt 21, arranged firmly on the doorpost, seizes the longer prong 7a of the fork, so that the fork member 7 is twisted over the point of the locking wedge 8 into the preliminary stop position (FIG. 2). Simultaneously, the main lock 2 also moves into the preliminary stop position. Whenever the main lock 2 pulls door 1 during the subsequent locking process into the plane of the wall, it shifts the operating peg 19 upwards, so that the locking wedge 8 can penetrate with the aid of the spiral spring 9 between the prongs of the fork member 7 and causes a further twisting of the fork member 7 through a wedge-type effect, until the door 1 fits completely (FIG. 3). At the same time the position of the oblong slots 13 and 18 is selected in such a manner that the automatic adjustment or after position of the auxiliary lock 4 will not be impeded. In the case of unlocking door 1 by pressure on the door handle 3, the operating peg 19 moves downward until the fork member 7 bursts open. Subsequently it moves back somewhat, so that the position of the locking wedge 8 corresponding to the preliminary stop position, will be reached.

Instead of a locking wedge 8, one can use possibly a horizontally arranged stop lever which has been mounted rotatably on the end facing away from the prong 7a of the fork and with which the linkage 20 engages in the middle area. By this arrangement one will achieve at the free end of the stop lever, cooperating with the prong 7a of the fork, enlargement of the adjusting path of the operating peg or pin 19.

We claim:

1. Auxiliary lock with a fork member with prongs arranged on the impact side of a door of a vehicle to swivel against the force of a first spring by a bolt provided firmly on the doorpost, comprising a stop bolt connected with an operating peg of a main lock, and a second spring connected to the bolt so that in the closed position of the door, the bolt engages by means of the second spring between the prongs of the fork member and which fits with a wedge surface against one of the prongs of the fork facing an outside wall of the door and which releases the fork member when the main lock is opened.

2. Auxiliary lock according to claim 1, in which a shiftable locking wedge is provided serving as the stop bolt, said locking wedge having an elongated slot for guidance and a peg for a spiral spring suspended from the door.

3. Auxiliary lock according to claim 1, in which a common baseplate is provided having the fork member on the stop bolt and the second spring mounted thereon.

4. Auxiliary lock according to claim 1, in which a shiftable locking wedge is provided serving as the stop bolt, said locking wedge having an elongated slot for guidance and a peg for a spiral spring suspended from the door, and in which the connection of the stop bolt with the operating peg is accomplished by a linkage with an elongated slot therein arranged on the end of the side of the stop bolt, said elongated slot extending from a pin of the stop bolt assigned thereto to the main lock in an unbolted condition of the door.

5. Auxiliary lock, according to claim 1, in which the stop bolt has a point which in the unbolted condition of the door protrudes somewhat into a circular arc described by a prong of the fork member on the outside of the door.